US008341411B2

(12) United States Patent
Brown et al.

(10) Patent No.: US 8,341,411 B2
(45) Date of Patent: Dec. 25, 2012

(54) ENABLING USE OF A CERTIFICATE STORED IN A SMART CARD

(75) Inventors: Michael K. Brown, Kitchener (CA); Neil Adams, Waterloo (CA); Herbert Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1632 days.

(21) Appl. No.: 11/464,896

(22) Filed: Aug. 16, 2006

(65) Prior Publication Data

US 2008/0072048 A1     Mar. 20, 2008

(51) Int. Cl.
*H04L 9/00* (2006.01)
(52) U.S. Cl. ........ 713/173; 713/171; 713/172; 713/176; 713/180; 726/4; 726/26
(58) Field of Classification Search .......... 713/171, 713/172, 173, 176, 180, 185; 726/4, 26
See application file for complete search history.

(56) References Cited

U.S. PATENT DOCUMENTS

| | | | |
|---|---|---|---|
| 5,721,781 A * | 2/1998 | Deo et al. ........................ 705/67 |
| 6,192,131 B1 | 2/2001 | Geer et al. |
| 6,317,829 B1 | 11/2001 | Van Oorschot |
| 6,345,098 B1 * | 2/2002 | Matyas et al. .................. 380/46 |
| 6,460,138 B1 | 10/2002 | Morris |
| 6,539,093 B1 | 3/2003 | Asad et al. |
| 6,564,319 B1 * | 5/2003 | Peters et al. .................. 713/156 |
| 6,643,751 B2 | 11/2003 | Rosenquist et al. |
| 6,810,479 B1 * | 10/2004 | Barlow et al. ................. 713/185 |
| 6,816,900 B1 | 11/2004 | Vogel et al. |
| 6,895,502 B1 * | 5/2005 | Fraser ........................... 713/168 |
| 7,016,666 B2 * | 3/2006 | Lauper et al. ................. 455/411 |
| 7,039,802 B1 | 5/2006 | Eskicioglu et al. |
| 7,096,204 B1 * | 8/2006 | Chen et al. ...................... 705/74 |
| 7,114,178 B2 | 9/2006 | Dent et al. |
| 7,124,938 B1 | 10/2006 | Marsh |
| 7,170,998 B2 | 1/2007 | McLintock |
| 7,243,230 B2 | 7/2007 | England et al. |
| 7,290,146 B2 | 10/2007 | Ekers et al. |
| 7,296,149 B2 * | 11/2007 | Hiltgen ......................... 713/161 |
| 7,356,539 B2 | 4/2008 | Brown et al. |
| 7,484,089 B1 * | 1/2009 | Kogen et al. .................. 713/156 |
| 2002/0026578 A1 | 2/2002 | Hamann et al. |

(Continued)

FOREIGN PATENT DOCUMENTS

EP     1633100     3/2006

(Continued)

OTHER PUBLICATIONS

Au et al., Cross-Domain One-Shot Authorization using Smart Cards, 2000, ACM, ISBN: 1-58113-203-4.*

(Continued)

*Primary Examiner* — Jeffrey Pwu
*Assistant Examiner* — Samuel Ambaye
(74) *Attorney, Agent, or Firm* — Integral Intellectual Property Inc.; Miriam Paton

(57) ABSTRACT

If a smart card is to be used for a particular purpose, and there is no certificate initialized on the smart card for this purpose, a computerized device enables a user to select one of the certificates already installed in the smart card for the particular purpose. The selected certificate may be imported into the computerized device.

25 Claims, 4 Drawing Sheets

U.S. PATENT DOCUMENTS

| | | | |
|---|---|---|---|
| 2002/0129257 | A1* | 9/2002 | Parmelee et al. ............. 713/180 |
| 2003/0041244 | A1 | 2/2003 | Buttyan et al. |
| 2003/0177353 | A1 | 9/2003 | Hiltgen |
| 2005/0086175 | A1 | 4/2005 | Brique et al. |
| 2005/0138387 | A1 | 6/2005 | Lam et al. |
| 2006/0047962 | A1 | 3/2006 | Adams et al. |
| 2006/0213982 | A1 | 9/2006 | Cannon et al. |
| 2006/0236117 | A1 | 10/2006 | Lazaridis et al. |
| 2007/0057057 | A1 | 3/2007 | Andresky et al. |
| 2007/0192610 | A1 | 8/2007 | Chun et al. |
| 2007/0300059 | A1 | 12/2007 | Yoneda |
| 2008/0046739 | A1 | 2/2008 | Adams et al. |

FOREIGN PATENT DOCUMENTS

| | | |
|---|---|---|
| WO | 2004/097605 | 11/2004 |
| WO | 2005048524 | 5/2005 |
| WO | 2005106618 | 11/2005 |

OTHER PUBLICATIONS

Schneier, Bruce, "Applied Cryptography—Protocols, Algorithms, and Source Code in C", (1996).

Chabot, Pedro, Second Examination Report for EP 06119047.6, Nov. 4, 2008.

Chabot, Pedro, First Examination Report for EP 06119047.6, May 2, 2008.

Chabot, Pedro, Extended European Search Report for 06119047.6, Dec. 15, 2006.

Chabot, Pedro, Fourth Exam Report for EP 06119047.6, Jul. 2, 2009.

Ghayour, Mehdi, Second Office Action for CA 2,593,977, May 31, 2012.

Shaw, Yin-Chen, Sixth Office Action for U.S. Appl. No. 11/464,900, Jan. 9, 2012.

Smart Card Alliance, RFID Tags and Contactless Smart Card Technology: Comparing and Contrasting Applications and Capabilities, Apr. 28, 2005.

HID Global, "HID Virtual Products—idBank", 2008.

HID Corp., "How an HID Card is "Read"", 2005.

HID Corp., "Smart Cards for Access Control Advantages and Technology Choices", Smart Cards for Access Control Advantages and Technology Choices, published 2005.

Beatty, John, Second Examination Report for EP 06119048.4, Mar. 18, 2009.

Beatty, John, Third Exam Report for EP 06119048.4, Mar. 16, 2011.

Beatty, John, Extended European Search Report for EP 06119048.4, Dec. 28, 2006.

Ekberg, Jan-Erik et al., "Nokia Research Center, On-board Credentials with Open Provisioning", Aug. 29, 2008.

Reynolds, Ryan, Second Office Action for CA 2,596,498, May 6, 2011.

Shaw, Yin Chen, Fifth Office Action for U.S. Appl. No. 11/464,900, Jul. 18, 2011.

Shaw, Yin-Chen, Advisory action for U.S. Appl. No. 11/464,900, Dec. 9, 2010.

Shaw, Yin-Chen, First Office Action for U.S. Appl. No. 11/464,900, Feb. 5, 2010.

Shaw, Yin-Chen, Fourth Office Action for U.S. Appl. No. 11/464,900, Jan. 25, 2011.

Shaw, Yin-Chen, Second Office Action for U.S. Appl. No. 11/464,900, Jul. 20, 2010.

Shreih, Raghid, First Office Action for CA 2,593,977, Oct. 7, 2010.

Smart Card Alliance, Using Smart Cards for Secure Physical Access, published Jul. 2003, publication number: ID-03003 Jul. 2003.

Ryan Reynolds, First Office Action for CA 2,596,498, Mar. 31, 2010.

* cited by examiner

ENABLING USE OF A CERTIFICATE STORED IN A SMART CARD

BACKGROUND

Smart Cards (SC) are widely used in conjunction with security measures such as authentication and encryption. For example, in order to access a computerized device and to access information using the computerized device, one may have to couple a smart card to the computerized device. Access to the computerized device and to information may be granted following a successful interaction between the computerized device and the smart card. The interaction may involve user input.

A smart card may be programmed or otherwise set to have security related information. An example is identification information of the smart card itself, for example, a serial number. Another example is an authentication password, where access to functionality of the smart card may require knowledge of the authentication password. A further example is one or more files that include specific items of information, such as personal identification information of one or more authorized users of the smart card.

Yet another example is a certificate/private key pair. A certificate may include a public key that is associated with the private key of the pair, and may also include a signature, identity information and a field defining one or more purposes assigned to the certificate. Private keys are stored in a secure area on the smart card and are not accessible from the outside. Certificates, on the other hand, may be exported from the smart card to other devices.

A certificate may be assigned, for example, for authentication of a user, for encryption of information, for signing information, for securing web browsing, for login into a WEB service and/or for providing an access to a network or a device. A smart card may include one or more certificate/private key pairs.

A certificate that is assigned to a particular purpose may include information specific to the purpose. For example, a certificate assigned for login into a network may include information about the network. The purpose defined in a certificate is not mandatory, and a certificate may be used for any other purpose.

Information is usually initialized into a smart card using dedicated equipment and usually by dedicated personnel, such as members of an IT (Information Technology) department of an organization. A smart card may be initialized for specific purposes with a particular number of certificate/private key pairs that are assigned for these specific purposes. At a later time, however, there may be a need to use the smart card for a purpose that is not defined in any of the certificates. Intervention of the dedicated personnel may then be required in order to initialize an additional certificate/private key pair in the smart card.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
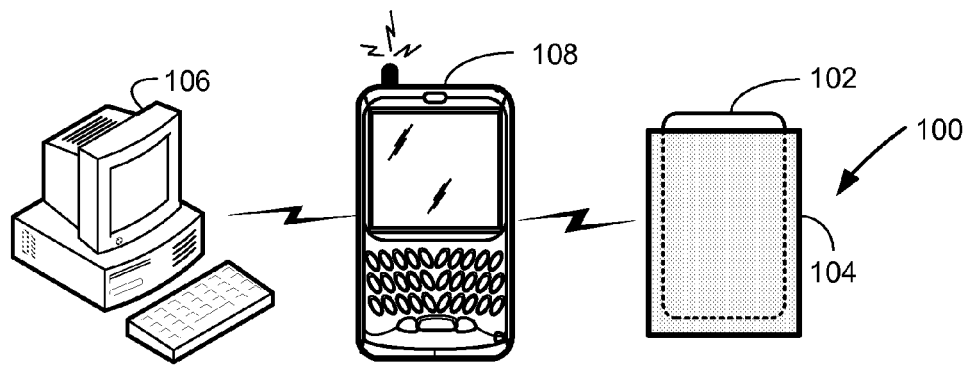
FIG. 1 is a schematic diagram of an exemplary system comprising a smart card, a smart card reader and computerized devices.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A smart card is traditionally initialized with content using dedicated equipment and dedicated personnel, such as members of an IT department of an organization. A smart card may be initialized with one or more pairs of a certificate and a private key and any one of the certificates may be assigned with particular one or two purposes. The purposes may be included in the certificate.

If a smart card is to be used for a particular purpose and there is no certificate initialized on the smart card for this purpose, a fairly complex operation is traditionally needed in order to initialize such a certificate on the smart card. Even if a certificate has been initialized on the smart card for this purpose, if a computerized device that is to use the certificate has been upgraded, information about the certificate may have been deleted from the computerized device.

According to some embodiments of the invention, a computerized device may enable a user to select one of the certificates already installed in the smart card for the particular purpose. The user may need to identify himself or herself by entering one or more correct passwords and will then be prompted to select a certificate. The device may import the selected certificate from the smart card.

According to some embodiments of the invention, the device may store a copy of the imported certificate in a memory of the device. To enable the user to use the device for the particular purpose, the device may verify that the user has coupled an appropriate smart card to the device and that the user has a permission to use the smart card. The device may send a challenge to the smart card and an identification of the selected certificate. The smart card may sign the challenge using the private key corresponding to the previously selected certificate. The device may verify the signature using the copy of the certificate and may permit the user to perform the desired operation.

According to other embodiments of the invention, the device may calculate a hash of the imported certificate and may store the calculated hash in a memory of the device. The hash may be stored in a region of the memory that is unaffected by upgrades to the device. To enable the user to use the device for the particular purpose, the device may verify that the user has coupled an appropriate smart card to the device and that the user has a permission to use the smart card. The device can import certificates from the smart card; all of them or one by one. The device may calculate the hash of the certificates in order to find a match with the previously stored hash. A matching hash, if found by the device, identifies the selected certificate. The smart card may sign the challenge using the private key corresponding to previously selected certificate. The device may verify the signature using the imported certificate and may permit the user to perform the desired operation.

According to some other embodiments of the invention, the device may calculate a hash of the imported certificate and may store both the calculated hash and a copy of the certificate in a memory of the device. To enable the user to use the device for the particular purpose, the device may verify that the user has coupled an appropriate smart card to the device and that the user has a permission to use the smart card. The device may check whether it stores a copy of the required certificate for that particular purpose and if so, may enable the user to use the device to perform a desired operation as described above with a challenge-response. If the device does not store a copy of the required certificate, for example, because it was previously erased from the device, it may use the hash as described above to identify the appropriate certificate.

FIG. 1 is a schematic diagram of an exemplary system 100 comprising a SC 102, a smart card reader (SCR) 104 and computerized devices 106 and 108.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g. a private decryption key, a private signing key, biometrics, an authentication certificate, etc.), and may include a decryption engine, e.g., a processor and/or dedicated logic, for example dedicated decryption logic and/or dedicated signing logic. A smart card may include a connector for powering the semiconductor device and performing serial communication with an external device. A smart card may be used for visual identification, time cards, door access, and the like.

A SCR is a device that can communicate with both the SC and a computerized device and can therefore be used to couple them. The SCR may include one or more driver applications to communicate with the SC and with the computerized device.

Some smart card readers are able to be mechanically and electrically coupled to the computerized device. For example, some smart card readers are designed to be permanently installed inside a computerized device such as a desktop computer. Other smart card readers, for example, those in the form factor of a PCMCIA (Personal Computer Memory Card International Association) card, are designed to be easily installable and removable at an appropriate bay in a mobile computerized device such as a laptop computer. Other smart card readers are designed to connect to a computerized device via an electrical cable.

However, smart card readers that are mechanically disconnected from the computerized device and can communicate with the computerized device using wireless communication are known. Since a wireless smart card reader does not require mechanical coupling to the computerized device, it can in principle maintain parallel communication sessions with two or more computerized devices via the wireless communication.

Although FIG. 1 shows smart card 102 inserted into with SCR 104, embodiments of this invention are equally applicable to contactless smart cards that communicate with their smart card readers via other means, for example, using radio frequency identification (RFID) technology.

Embodiments of the invention are applicable to any computerized device, whether stationary or mobile, that is able to communicate with a SCR. For example, the communication may be possible via a wired, wireless or optical communication means.

A non-exhaustive list of examples for devices 106 and 108 includes any of the following computerized devices, for example, server computers, notebook computers, laptop computers, mobile computers, mobile terminals, pocket computers, desktop personal computers, personal digital assistants (PDAs), handheld computers, cellular telephones, MP3 players, and the like.

In exemplary system 100, computerized device 108 is able to communicate with SCR 104 and via SCR 104, with SC 102. In addition computerized device 108 is able to communicate with computerized device 106.

Figure 2:
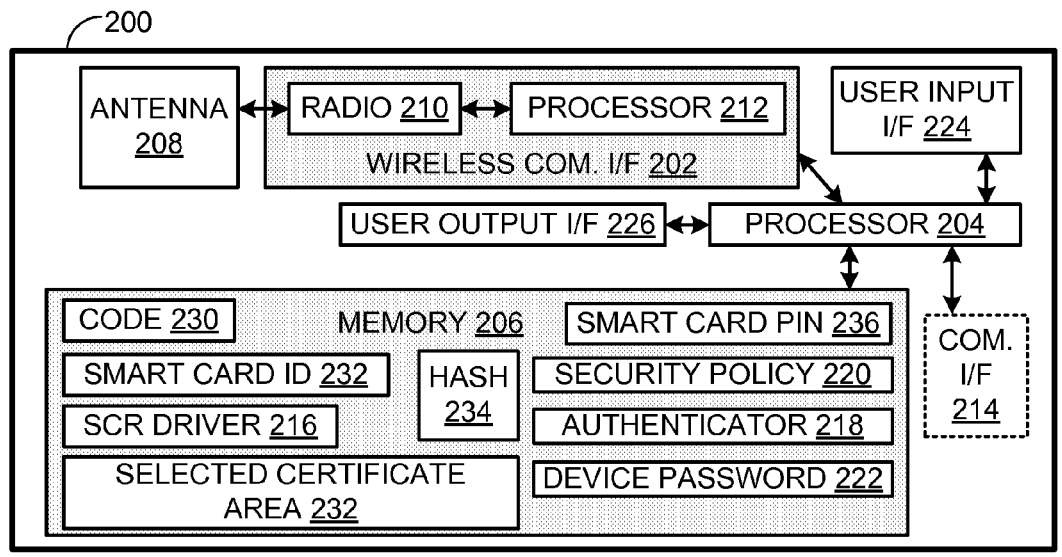
FIG. 2 is a block diagram of an exemplary computerized device.

FIG. 2 is a block diagram of an exemplary computerized device 200, according to some embodiments of the invention. Device 200 is an example of device 108.

Device 200 comprises a communication interface 202, a processor 204 coupled to communication interface 202 and a memory 206 coupled to processor 204. Memory 206 may be fixed in or removable from device 200. Processor 204 and memory 206 may be part of the same integrated circuit or in separate integrated circuits.

In the example shown in FIG. 2, communication interface 202 is a wireless communication interface 202 and device 200 also comprises an antenna 208. Wireless communication interface 202 comprises a radio 210 coupled to antenna 208, and a processor 212 coupled to radio 210. Wireless communication interface 202 and processor 204 may be part of the same integrated circuit or in separate integrated circuits.

Device 108 may be able to communicate with SCR 104 via communication interface 202 and may be able to communicate with device 106 via communication interface 202. Alternatively, or in addition, device 108 may include a communication interface 214 and may be able to communicate with device 106 via communication interface 214.

Memory 206 stores a SCR driver 216, an authenticator 218, a security policy 220 and a device password 222. Device 200 includes a human input interface 224, such as a keyboard, and a human output interface 226, such as a display. As part of an authentication process, user output interface 226 may prompt the user to enter a device password using user input interface 224, and authenticator 218 may compare the entered password to device password 222.

Security policy 220 may be predefined and/or downloadable to device 108 from device 106, and may define security related parameters and behaviors for device 108. For example, security policy 220 may define if and for what purpose an authentication password that is stored on a smart card, and device password 222, are to be used and may define qualities of these passwords. In other examples, security policy 220 may define whether a two-factor challenge-response authentication is to be used or not, whether or not weak certificates are permitted, and how to treat revoked, invalid or untrusted certificates.

Memory 206 also stores executable code 230 which, when executed by processor 204, causes device 200 to perform its part in the methods described hereinbelow.

Figure 3:
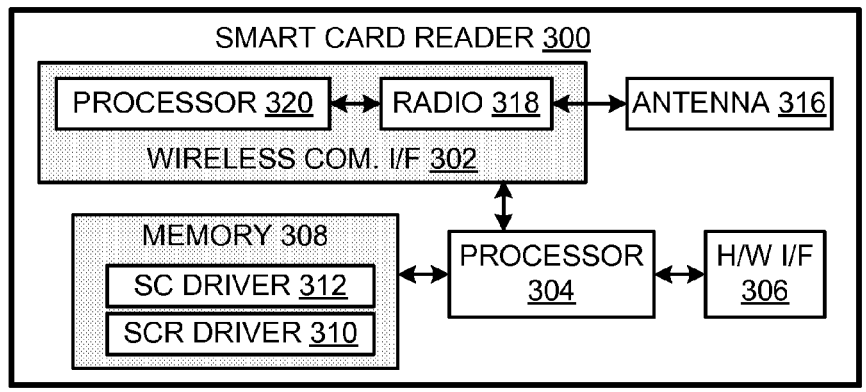
FIG. 3 is a block diagram of an exemplary smart card reader.

FIG. 3 is a block diagram of an exemplary SCR 300, according to some embodiments of the invention. SCR 300 is an example of SCR 104.

SCR 300 includes a communication interface 302, a processor 304 coupled to wireless communication interface 302, a hardware interface 306, and a memory 308 coupled to processor 304. For example, hardware interface 306 is a connector that mates to a corresponding connector with contact pins on a smart card. Memory 308 may be fixed in or removable from smart card reader 300. Memory 308 may be embedded or partially embedded in processor 304. Memory 308 stores a smart card reader driver 310 and a smart card driver 312.

Processor 304 and memory 308 may be part of the same integrated circuit or in separate integrated circuits.

In the example shown in FIG. 3, communication interface 302 is a wireless communication interface 302 and SCR 300 also comprises an antenna 316. Wireless communication interface 302 comprises a radio 318 coupled to antenna 316, and a processor 320 coupled to radio 318. Wireless communication interface 302 and processor 304 may be part of the same integrated circuit or in separate integrated circuits.

Figure 4:
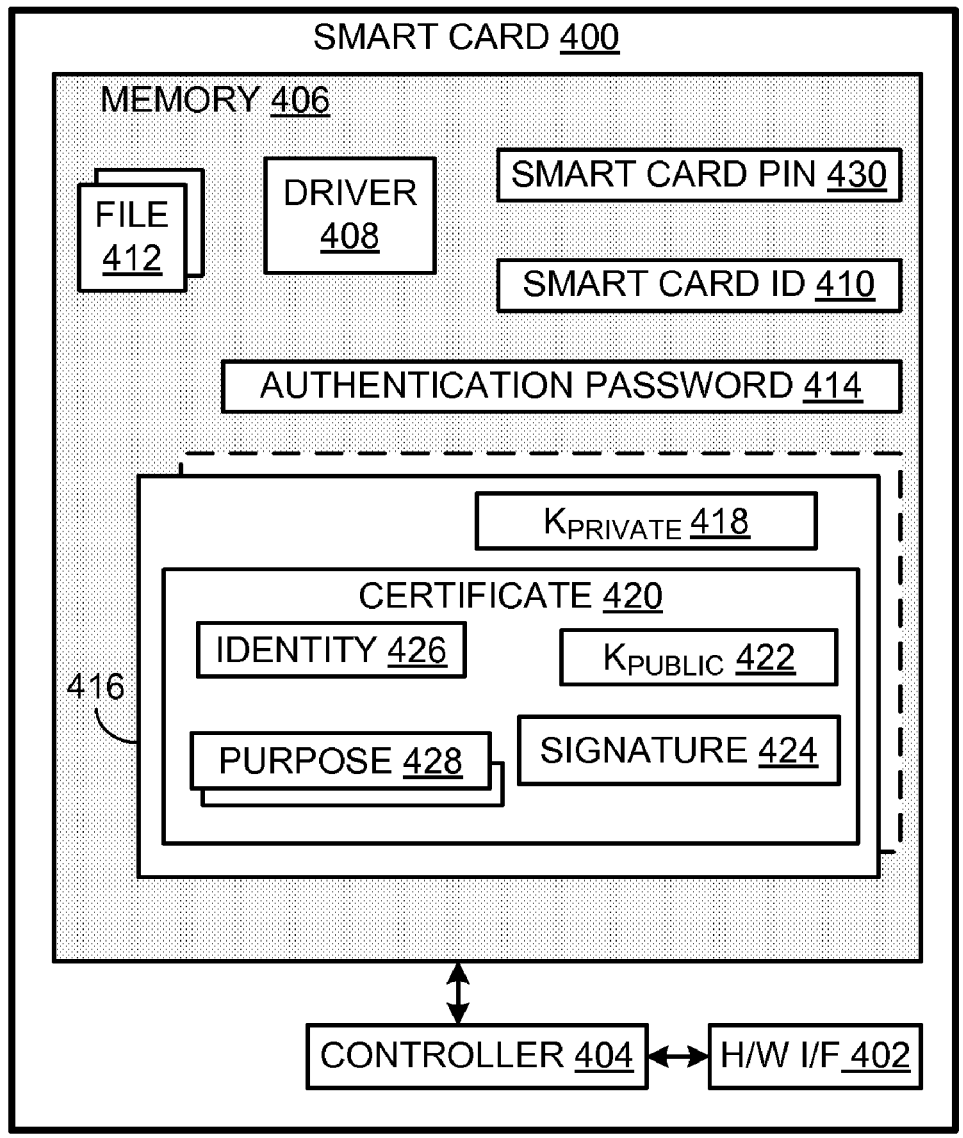
FIG. 4 is a block diagram of an exemplary smart card.

FIG. 4 is a block diagram of an exemplary SC 400, according to some embodiments of the invention. SC 400 is an example of SC 102. SC 400 includes a hardware interface 402, a controller 404 coupled to hardware interface 402, and a memory 406 coupled to controller 404.

Memory 406 stores a driver 408 to handle functionality of SC 400, a smart card identification 410, for example a serial number, and one or more files 412 with information about the smart card's owner and/or any other information. Memory 406 may store an authentication password 414 to be used in conjunction with authenticator 218 of SCR 300. As part of an authentication process, user output interface 226 may prompt the user to enter an authenticator password using user input interface 224 and authenticator 218 may compare the entered password to authentication password 414.

Memory 406 may store one or more pairs 416 each comprising a private key 418 ($K_{PRIVATE}$) and a certificate 420. Any of certificates 420 may comprise a public key ($K_{PUBLIC}$) 422 associated with private key 418, a signature 424, identification information 426 and one or more definitions 428 of purposes assigned to the certificate.

Memory 406 may store in addition a smart card PIN (Personal Identification Number) 430.

A non-exhaustive list of examples for antennae 208 and 316 includes dipole antennae, monopole antennae, multilayer ceramic antennae, planar inverted-F antennae, loop antennae, shot antennae, dual antennae, omnidirectional antennae and any other suitable antennae.

A non-exhaustive list of examples of communication protocols with which communication interfaces 202 and 302 may be compatible includes Bluetooth®, ZigBee™, radio frequency identification (RFID), ultra wideband (UWB), IEEE 802.11, and proprietary communication protocols.

A non-exhaustive list of examples for processors 204, 212, 304 and 320 and controller 404 includes a central processing unit (CPU), a digital signal processor (DSP), a reduced instruction set computer (RISC), a complex instruction set computer (CISC) and the like. Furthermore, processors 206, 218, 306 and 318 may be part of application specific integrated circuits (ASICs) or may be a part of application specific standard products (ASSPs).

A non-exhaustive list of examples for memories 206, 308 and 406 includes any combination of the following:
a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
b) optical devices, such as compact disk read only memory (CD ROM), and the like; and
c) magnetic devices, such as a hard disk, a floppy disk, a magnetic tape, and the like.

Device 200, SCR 300 and SC 400 include additional components which are not shown in FIGS. 2, 3 and 4 and which, for clarity, are not described herein.

Figure 5:
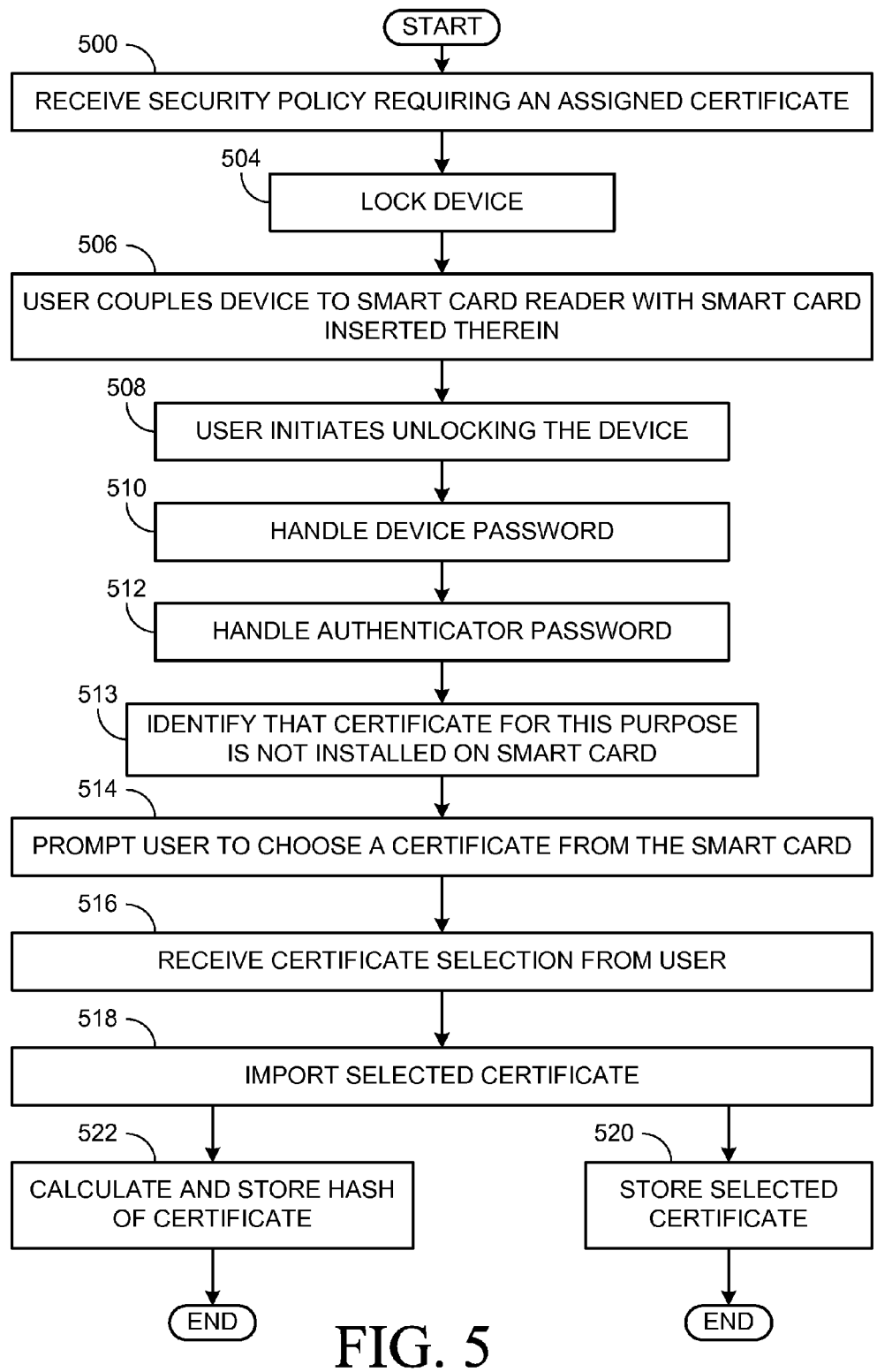
FIG. 5 is a flowchart of an exemplary method to enable the use of a certificate stored in a smart card.

FIG. 5 is a flowchart of an exemplary method to enable use of a certificate stored in smart card 400.

At 500, device 200 stores in memory 206 security policy 220 that requires a certificate installed in SC 400 for a particular purpose. For example, security policy 220 may require a certificate for the purpose of authentication of a user, two-factor authentication challenge/response, encryption of information, signing information, securing web browsing, login into a WEB service and/or providing access to a network or a device.

If device 200 is not already locked, at 504, device 200 may become locked. At 506, a user that wants to perform an operation involving device 200 couples SC 400 to SCR 300 and SCR 300 to device 200. At 508, the user initializes a process of authenticating himself or herself to device 200, for example, by turning on device 200 or by activating user input interface 224 in a pre-defined manner.

At 510, device 200 may prompt the user to set a new device password and may store the received device password as device password 222. Otherwise, if device password 222 is already defined, device 200 may prompt the user to enter a device password and may compare the entered password to a value stored in device password 222.

At 512, device 200 may prompt the user to set a new authentication password and may store the received authentication password as authentication password 414 in memory 406 of SC 400. Otherwise, if authentication password 414 is already defined, device 200 may prompt the user to enter an authentication password and may compare the entered password to a value stored in authentication password 414.

At 513, device 200 identifies that SC 400 does not store a certificate that is assigned with the particular purpose required by security policy 220.

At 514, device 200 may prompt the user to select one of certificates 420 for the particular purpose defined in security policy 220. At 516, device 200 receives from the user a selection of one of certificates 420. At 518, device 200 imports the selected certificate from SC 400.

At 520, device 200 may store a copy of the selected certificate into a selected certificate store area 232 in memory 206. At 522, device 200 may calculate a hash 234 of the selected certificate and may store hash 234 in memory 206.

Device 200 may perform only one of boxes 520 and 522, or may perform both.

Many modifications to this method are contemplated. For example, the requirement that a certificate installed in SC 400 be used for a particular purpose may be enabled by the user of device 200, rather than from a security policy 220. In another example, if device 200 has already imported the certificates from SC 400 (for other purposes), then device 200 may determine already after 500 that a certificate for this particular purpose is not installed on SC 400.

Figure 6:
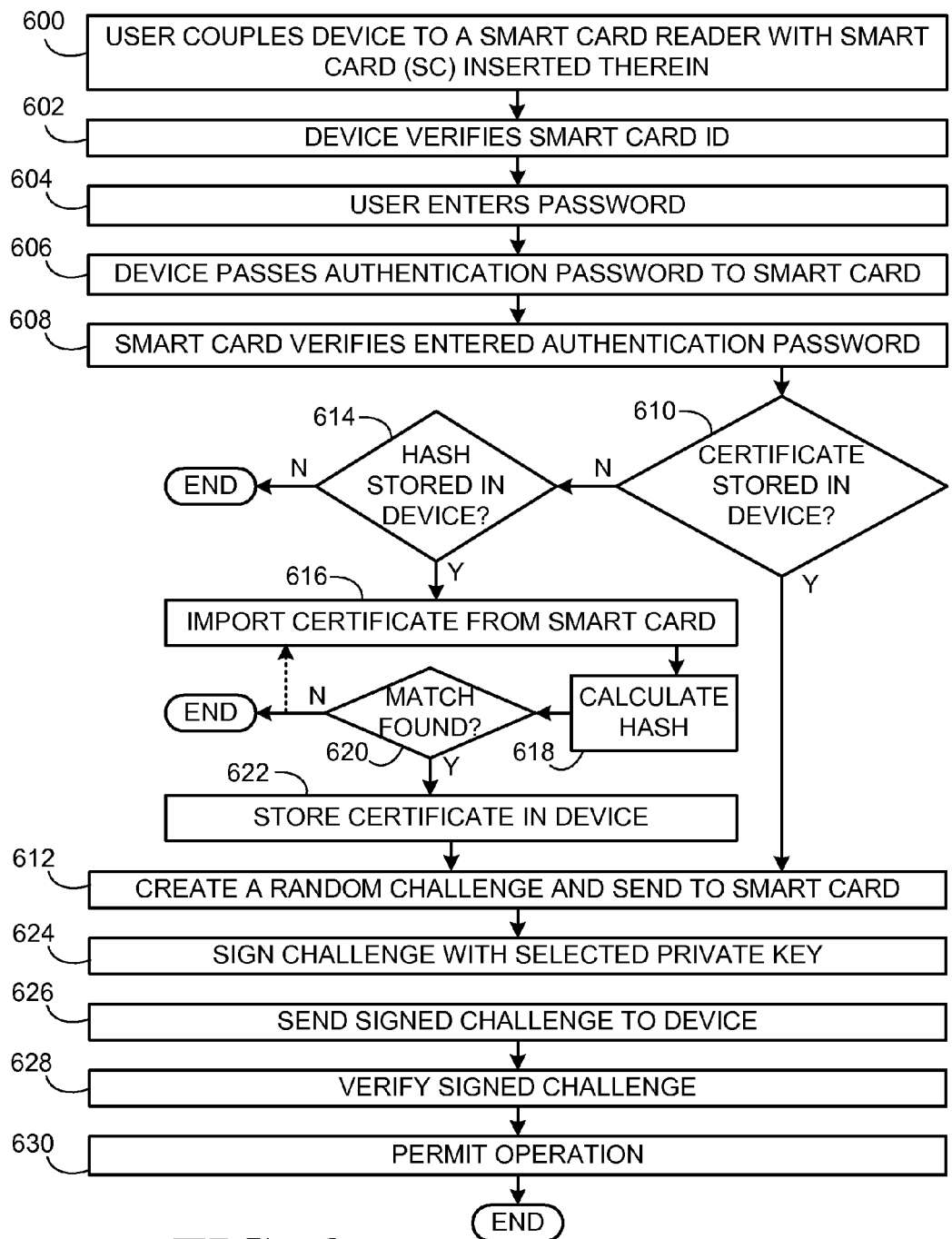
FIG. 6 is a flowchart of another exemplary method to enable the use of a certificate stored in a smart card.

FIG. 6 is a flowchart of another exemplary method to enable the use of a certificate stored in a smart card to perform an operation that requires a particular certificate. Device 200 may have been upgraded and information about the particular certificate, or even a copy of the particular certificate stored in device 200, may have been deleted from device 200 during the upgrade. At 600, a user couples SC 400 to SCR 300 and SCR 300 to device 200. At 602, device 200 verifies whether it recognizes smart card 400. For example, device 200 may read smart card identifier 410 from SC 400 and may compare it to a smart card identifier 232 previously stored in memory 206.

At 604, device 200 prompts the user to enter an authentication password and at 606, device 200 passes the password entered by the user to SC 400 for verification. At 608, SC 400 verifies whether the entered password is identical to authentication password 414.

If, as shown at 610, a copy of the particular certificate is stored in area 232, the method may continue to 612. If a copy of the certificate is not stored in area 232 and a hash of the particular certificate is not stored in hash 234, the method may terminate, as shown at 614. If, however, a hash of the particular certificate is stored in hash 234, the method may continue to 616.

At 616, device imports one of the certificates stored in SC 400 and at 618, device 200 calculates a hash of the imported certificate. At 620, device 200 compares the calculated hash to hash 234. If the calculated hash is not identical to hash 234, the method may continue to 616 to check other certificates stored on SC 400, or may terminate, if all certificates on SC 400 were checked and no match was found. Although the flowchart of FIG. 6 shows the device importing the certificates one at a time, the device may import all of the certificates and then check them one at a time.

If, however, device 200 imports a certificate and finds that the hash of the certificate is identical to hash 234, at 622, device 200 may store the imported certificate in area 232. The method may continue to 612.

At 612, device 200 generates a random challenge and sends the challenge and an identification of the certificate stored in area 232 to SC 400. Using the private key paired with the selected certificate, SC 400 signs the challenge at 624, and at 626, SC 400 sends the signed challenge to device 200.

Using the certificate stored in area 232, device 200 verifies at 628 that the challenge is signed with the private key paired with that certificate. If the challenge is signed with the private key paired with the certificate stored in area 232, device 200 permits a desired operation, for example, unlocking device 200 for the user to use.

Computer-executable instructions for performing any portions of the above-described method may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by device 108 and/or SCR 104, including by internet or other computer network forms of access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a computerized device coupled to a smart card reader, the method comprising:
   identifying that a smart card that is coupled to said smart card reader stores one or more certificates that are not assigned to a particular purpose for which a certificate requirement exists;
   enabling selection for said particular purpose, via a user input interface of said computerized device, of a certificate from said one or more certificates;
   importing said selected certificate to said computerized device for said particular purpose;
   sending a challenge to said smart card;
   receiving a signed version of said challenge from said smart card;
   using said imported certificate to verify that said signed version is signed using a private key paired to said imported certificate; and
   permitting said particular purpose on said computerized device if said signed version is verified.

2. The method of claim 1, further comprising:
   storing said imported certificate in said computerized device.

3. The method of claim 1, wherein said particular purpose is unlocking said computerized device.

4. The method of claim 1, wherein said particular purpose is accessing information via said computerized device.

5. The method of claim 1, wherein said particular purpose is accessing a network via said computerized device.

6. The method of claim 1, further comprising:
   enabling receipt of a password;
   comparing said received password to an authentication password stored in said smart card; and
   importing said selected certificate only if said received password and said authentication password stored in said smart card are identical.

7. The method of claim 1, further comprising:
   calculating a hash of said imported certificate; and
   storing said hash in said computerized device.

8. The method of claim 7, in the event that said imported certificate is no longer stored in said computerized device, the method further comprising:
   importing another certificate to said computerized device;
   calculating a hash of said other imported certificate; and
   comparing said hash of said other imported certificate to said stored hash.

9. The method of claim 8, further comprising:
   if said hash of said other imported certificate and said stored hash are identical, using said other imported certificate for said particular purpose in said computerized device.

10. The method of claim 1, further comprising:
    identifying said imported certificate to said smart card in conjunction with sending said challenge to said smart card.

11. A non-transitory computer-readable medium having computer-executable instructions thereon which, when executed by a computerized device that is coupled to a smart card reader, result in:
    identifying that a smart card that is coupled to said smart card reader stores one or more certificates that are not assigned to a particular purpose for which a certificate requirement exists;

enabling selection for said particular purpose, via a user input interface of said computerized device, of a certificate from said one or more certificates;

importing said selected certificate to said computerized device for said particular purpose;

sending a challenge to said smart card;

receiving a signed version of said challenge from said smart card;

using said imported certificate to verify that said signed version is signed using a private key paired to said imported certificate; and permitting said particular purpose on said computerized device if said signed version is verified.

12. The non-transitory computer-readable medium of claim 11, wherein said instructions, when executed by said computerized device, further result in:

storing said imported certificate in said computerized device.

13. The non-transitory computer-readable medium of claim 11, wherein said instructions, when executed by said computerized device, further result in:

enabling receipt of a password;

comparing said received password to an authentication password stored in said smart card; and importing said selected certificate only if said received password and said authentication password stored in said smart card are identical.

14. The non-transitory computer-readable medium of claim 11, wherein said instructions, when executed by said computerized device, further result in:

calculating a hash of said imported certificate; and storing said hash in said computerized device.

15. The non-transitory computer-readable medium of claim 11, wherein said instructions, when executed by said computerized device, further result in:

identifying said imported certificate to said smart card in conjunction with sending said challenge to said smart card.

16. A computerized device comprising:

a communication interface through which said computerized device is able to couple to a smart card reader;

a user input interface;

a processor coupled to said communication interface and to said user input interface; and a memory coupled to said processor, said memory arranged to store code which, when executed by said processor, is arranged:

to identify that a smart card coupled to said smart card reader stores one or more certificates that are not assigned to a particular purpose for which a certificate requirement exists;

to enable selection for said particular purpose, via said user input interface, of a certificate from said one or more certificates;

to import said selected certificate to said computerized device for said particular purpose;

to send a challenge to said smart card;

to receive a signed version of said challenge from said smart card;

to use said imported certificate to verify that said signed version is signed using a private key paired to said imported certificate; and to permit said particular purpose on said computerized device if said signed version is verified.

17. The computerized device of claim 16, wherein said code, when executed by said processor, is further arranged:

to store said imported certificate in said computerized device.

18. The computerized device of claim 16, wherein said code, when executed by said processor, is further arranged:

to identify said imported certificate to said smart card in conjunction with sending said challenge to said smart card.

19. The computerized device of claim 16, wherein said particular purpose is unlocking said computerized device.

20. The computerized device of claim 16, wherein said particular purpose is accessing information via said computerized device.

21. The computerized device of claim 16, wherein said particular purpose is accessing a network via said computerized device.

22. The computerized device of claim 16, wherein said code, when executed by said processor, is further arranged:

to enable receipt of a password;

to compare said received password to an authentication password stored in said smart card; and to import said selected certificate only if said received password and said authentication password stored in said smart card are identical.

23. The computerized device of claim 16, wherein said code, when executed by said processor, is further arranged:

to calculate a hash of said imported certificate; and to store said hash in said computerized device.

24. The computerized device of claim 23, wherein said code, when executed by said processor, is further arranged, in the event that said imported certificate is no longer stored in said computerized device:

to import another certificate to said computerized device;

to calculate a hash of said other imported certificate; and to compare said hash of said other imported certificate to said stored hash.

25. The computerized device of claim 24, wherein said code, when executed by said processor, is further arranged:

if said hash of said other imported certificate and said stored hash are identical, to use said other imported certificate for said particular purpose in said computerized device.

* * * * *